July 4, 1933.  G. A. JESSOP ET AL  1,917,037
MANUFACTURE OF FRANCIS RUNNERS FOR HYDRAULIC TURBINES
Filed Nov. 28, 1931  4 Sheets-Sheet 1

INVENTORS
GEORGE A. JESSOP AND
DANIEL C. DE VINE.
BY
ATTORNEY

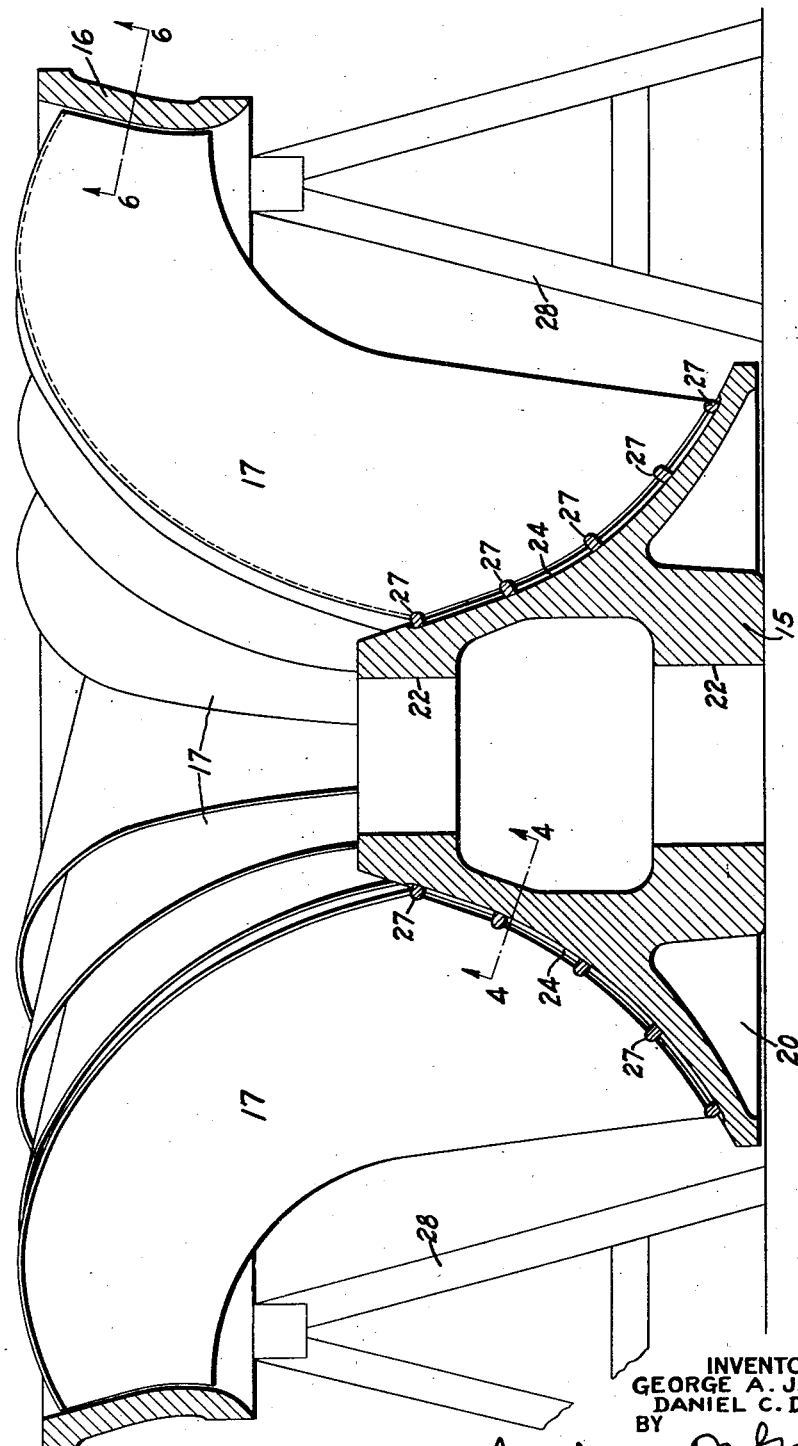

July 4, 1933.   G. A. JESSOP ET AL   1,917,037
MANUFACTURE OF FRANCIS RUNNERS FOR HYDRAULIC TURBINES
Filed Nov. 28, 1931   4 Sheets-Sheet 3
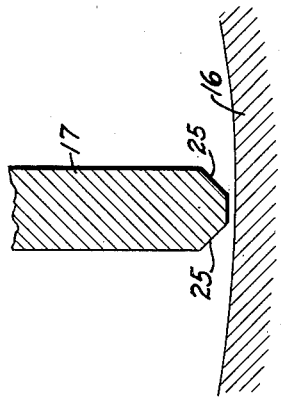
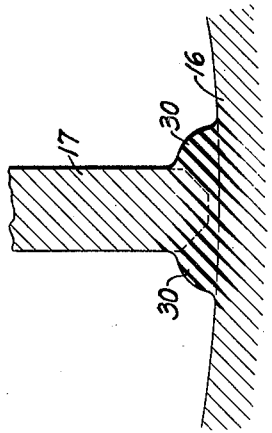
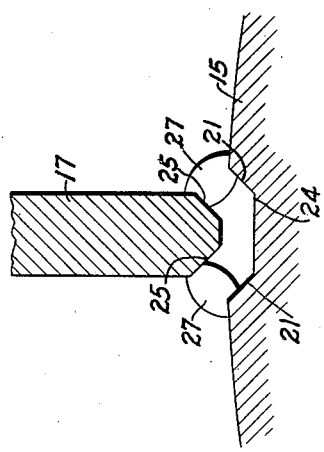
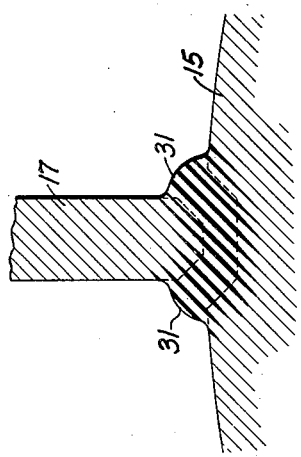
INVENTORS
GEORGE A. JESSOP AND
DANIEL C. DE VINE.
BY
Malcolm N. Gannett
ATTORNEY July 4, 1933. G. A. JESSOP ET AL 1,917,037
MANUFACTURE OF FRANCIS RUNNERS FOR HYDRAULIC TURBINES
Filed Nov. 28, 1931 4 Sheets-Sheet 4

INVENTORS
GEORGE A. JESSOP AND
DANIEL C. DE VINE.
BY
ATTORNEY

Patented July 4, 1933

1,917,037

UNITED STATES PATENT OFFICE

GEORGE A. JESSOP AND DANIEL C. DE VINE, OF YORK, PENNSYLVANIA, ASSIGNORS TO S. MORGAN SMITH COMPANY, OF YORK, PENNSYLVANIA, A CORPORATION OF PENNSYLVANIA

MANUFACTURE OF FRANCIS RUNNERS FOR HYDRAULIC TURBINES

Application filed November 28, 1931. Serial No. 577,772.

This invention relates to hydraulic turbines, and especially to the manufacture of the runners.

In the generation of power with the use of water, one type of turbine has comprised what is known as the Francis runner. This runner is disposed within an annular member or casing having a plurality of wicket gates mounted therein, and the runner and the casing are mounted in a scroll case or conduit which conducts the water from the penstock thereto. The purpose of the wicket gates is to control the amount of water which is delivered to the runner, and therefore, the wicket gates are made adjustable. A shaft is fixed to the runner, and this shaft in turn may be connected to an electric generator, power transmitting machinery, or any other means which are adapted to be run from the power produced by the turbine.

The Francis type of runner comprises a hub or crown, to which the shaft is fixed, a shroud ring or band, and a plurality of blades or buckets, which latter are fixed at one end to the hub or crown and at the other end to the shroud ring or band. Only a small number of buckets are employed in this type of runner, in most instances not more than thirty. These buckets are similarly formed with the desired warp and curvature, and are uniformly spaced apart.

Heretofore, in the known methods of manufacturing high efficiency Francis runners, two methods were used. In the first and oldest method, the runners were made in the form of a single casting which was formed from either iron, steel, or bronze. In the second and later method, the buckets were made from plate steel or other suitable sheet metal, and the hub and the band were cast thereto, so that a unitary structure was provided, which was composed partly of sheet metal and partly of cast metal.

With the all cast method, the runner has to be made with sand cores, and the spaces between the buckets and the hub and the buckets and the shroud ring are all small. Furthermore, the surfaces of the buckets are always subjected to uncertain changes during casting by reason of mould swell. In finishing the cast runners, it is difficult to remove the molding sand, which has to be chipped off in the narrow spaces between the buckets, and due to their shape, the buckets could not be machined true, and the shroud ring could not be machined on its inside surface to remove fused sand and irregularities, so as to produce the exact diameter as designed.

Moreover in casting the runner in one piece, large and uncertain strains are produced which are known as "casting strains". These casting strains impose severe initial stresses on the casting and especially on the portions of the buckets near the hub and the shroud ring. These stresses are sometimes sufficient to cause cracks or checks in the buckets.

When the runners are made by casting the hub and the shroud ring to sheet metal buckets, the buckets sometimes burn where they enter the cast metal of the hub and the shroud ring. When such is the case, the structure is very much weakened at these points. Sometimes if the molten casting metal is not hot enough, the sheet metal buckets do not knit properly to the hub and shroud ring, and the runner is not of proper strength. Furthermore, during the cooling of the molten metal, the buckets may be warped out of shape by reason of shrinkage of the metal, thus reducing the efficiency and capacity of the runner, increasing pitting and causing hydraulic and mechanical unbalance.

In modern high speed hydraulic turbines, some of which have an efficiency of 90% and over, every gain of one per cent or fractional portion thereof is considered in practice of considerable importance, and imposes large savings in water turbine power plants, so that any improvement in efficiency is of prime importance to users.

While it is comparatively easy to improve low efficiency turbines, it becomes difficult to improve the turbines as the efficiency increases, and this is especially true in the upper ranges.

It is well known that when the surfaces of the body of the runner are very smooth, friction is reduced to a minimum. Therefore, in order to produce a runner having higher efficiency, it is necessary to form the portion of the runner which comes in contact with the water perfectly smooth, so that little or no resistance will be offered to the water when it passes between the buckets. Thus, when the buckets are perfectly smooth, the hub is smooth, and the shroud ring is smooth throughout, and these parts are free from sand and have no irregular surfaces, high efficiency will result with an increased specific speed.

An object of the invention is to provide an improved Francis runner for hydraulic turbines.

Another object of the invention is to provide an improved method for manufacturing Francis runners so that runners having very high efficiency are produced.

Another object of the invention is to provide an improved runner of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 3 is a vertical section of the hub, showing the buckets and shroud ring assembled in position thereon ready for uniting them together, the shroud ring being also shown in section;

Figure 4 is an enlarged section taken on the line 4—4 of Fig. 3 showing the relative position of the edge of a bucket to the adjacent portion of the hub, and also showing the manner of tacking the buckets to the hub when the parts are being assembled;

Figure 5 is a view similar to Fig. 4 of the parts after they have been united together;

Figure 6 is an enlarged section taken on the line 6—6 of Fig. 3, showing the relative position of the edge of a bucket to the adjacent portion of the shroud ring;

Figure 7 is a view similar to Fig. 6 of the parts after they have been united together.

We have found that if a Francis runner is composed of a pre-formed and finished hub, buckets preformed from suitable metal, and a shroud ring pre-formed from a single piece of material, all of said parts being united together to produce a unitary structure, the result will be a runner having regular surfaces throughout, and consequently the runner will have more capacity, higher efficiency, and better hydraulic and mechanical balance, than the runners heretofore produced by the known methods of manufacture. Furthermore, the runner will be free of all casting strains, and since the parts are composed of pre-finished materials, pitting will be reduced to a minimum.

Figure 1:
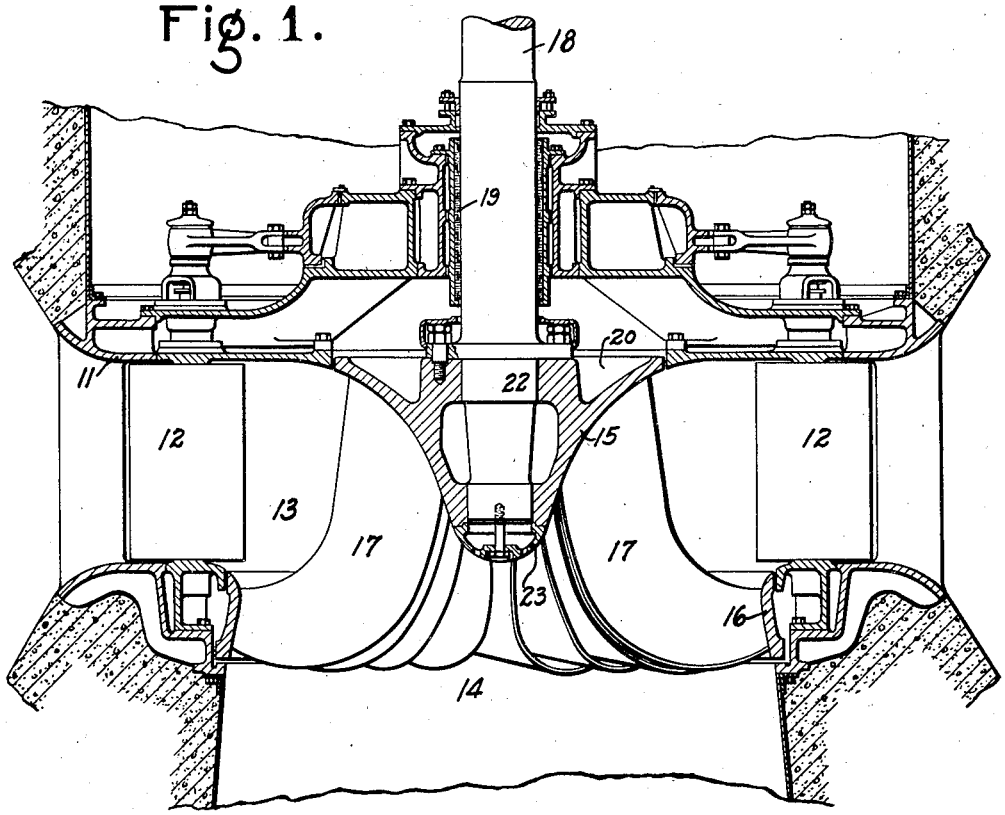
Figure 1 is a vertical section of a portion of a hydraulic turbine having a Francis runner constructed according to the invention.

Referring to the drawings and especially to Fig. 1, the turbine comprises a casing 11 which forms a peripheral water inlet in which are mounted an annular series of wicket gates 12. The wicket gates are adapted to be rotated simultaneously into different angular positions to control the flow of water to the rotor or runner of the turbine in a well known manner. The lower portion of the casing 11 forms an axially directed chamber 13 in which the runner 14 operates.

In hydraulic turbines of the type illustrated, a Francis runner is used. This form of runner consists of a hub or crown 15, a shroud ring or band 16, and a plurality of buckets or blades 17 which are interposed between the hub 15 and the shroud ring 16. The hub 15 of the runner 14 is fixed to the lower end of a shaft 18, journalled in a suitable bearing 19 mounted in the upper portion of the turbine casing 11.

Since it has been difficult to produce high efficiency runners in which all of the surfaces were smooth and accurately formed by the known methods of manufacture, it is proposed by the present invention to separately form and finish the several parts of the runner and then unite the finished parts into a homogeneous whole. That is to say, the hub is made separately and the water surfaces finished all over, the several buckets are formed separately and finished all over, and the band or shroud ring is made separately and the water surfaces finished all over. The parts are then assembled and united together in the manner to be hereinafter described.

In manufacturing a Francis runner according to the present invention, the hub 15 is preferably made from cast steel, although any other suitable material may be used, the shroud ring 16 is made in the form of a single piece from steel or other suitable material, and the buckets 17 are formed from sheet steel, cast steel, bronze, or any other weldable material.

Figure 2:
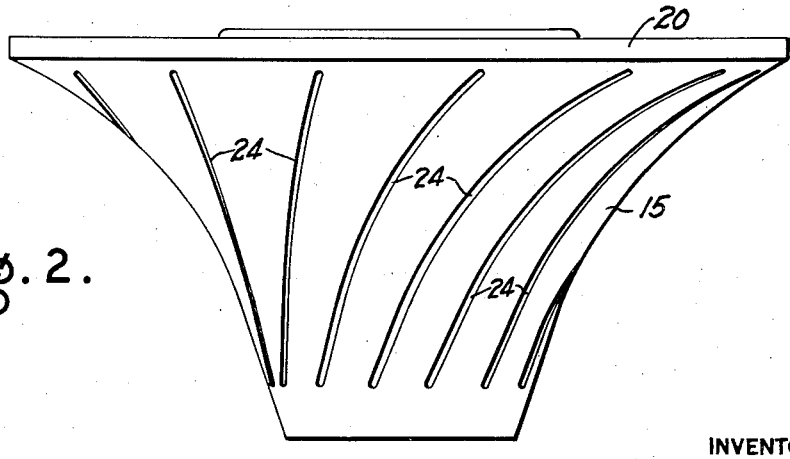
Figure 2 is an enlarged side elevation of the hub of the runner before the buckets are secured thereto.

As shown in Figs. 1, 2 and 3, the hub 15 is preferably somewhat conical in outline, and has a substantially broad top portion 20, from which depends the main conical body. The hub is formed with an axial opening 22 for receiving the end of the shaft 18. The opening 22 extends through the hub. The lower end of the hub 15 is provided with a cap 23 (see Fig. 1) which is adapted to close the opening 22. However, the cap 23 is not fixed to the hub until the parts are being assembled in the turbine. It is to be understood that if so desired, the hub 15 can be made from a forging or in any other desired manner than by casting. In either case the surfaces of the hub are finished smooth.

If so desired after the hub 15 is made a series of grooves 24 may be formed on the outer surface thereof, there being a groove provided for each bucket. The grooves 24 may be comparatively shallow and should be curved to conform to the curved or warped edges of the buckets 17 (see Fig. 2). The sides or edges of the grooves 24 should be bevelled, as indicated at 21, Fig. 4. While in the present instance the hub 15 is shown as having grooves 24 thereon, it is to be understood that these grooves may be dispensed with, without departing from the main features of our invention.

When the buckets 17 are made from sheet material, the material is first cut to shape and then formed in a press to produce the proper curvature or warped surface. After the buckets are formed, the edges thereof are ground, or otherwise bevelled on both sides, as indicated at 25, Figs. 4 and 6.

Figure 8:
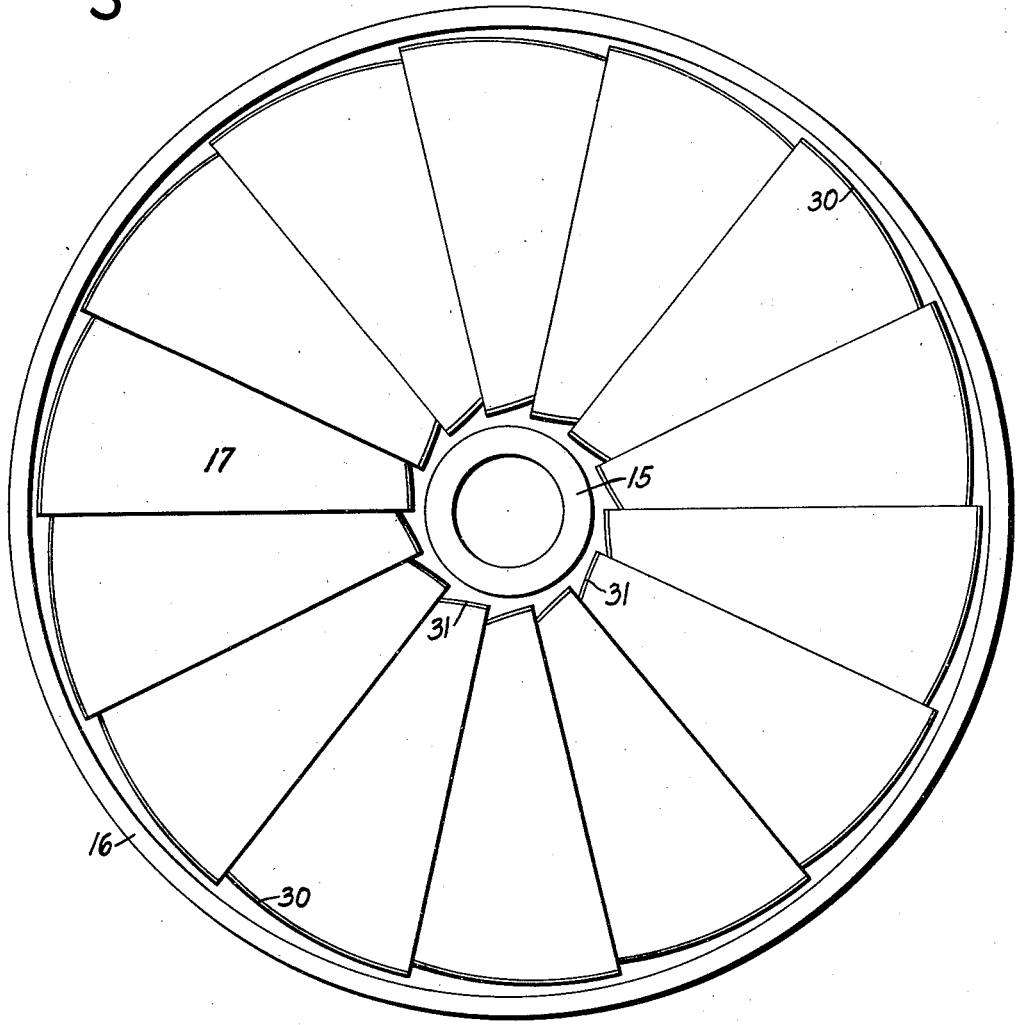
Figure 8 is a bottom plan of the runner after the parts have been united together.

As shown in Fig. 8, the shroud ring 16 may be cast or forged from suitable material, such as steel, or it may be made by rolling and bending a bar of metal to the desired shape. If the latter method is used, the abutting ends are fused or welded together. After the shroud ring 16 is formed, it is finished perfectly smooth, especially on the inner or water surfaces thereof.

In assembling all of the parts of the runner preparatory to uniting them together, the hub 15 is first placed in an inverted position on the floor or other support with the top portion 20 down, as shown in Fig. 3.

The next step consists in successively mounting the several buckets 17 in position on the hub 15. When the surface of the hub is grooved, as at 24, the buckets are positioned over the grooves. In either case, however, the buckets are superposed on the hub so that the edges of the buckets are spaced slightly above the face of the hub 15, as shown in Fig. 4. The buckets are next trued and properly alined relatively to each other and to the hub.

When the buckets are thus positioned with respect to the hub V-shaped spaces will be formed between the edges of the buckets and the hub, the purpose of which will be hereinafter described.

The next step in producing the runners consists in applying spots of welding 27 at suitable intervals along both sides of the edges of the buckets, so as to tack or otherwise secure the buckets to the hub, as shown in Figs. 3 and 4. The purpose of these spots of welding is to securely hold the buckets in position on the hub during the formation of the runner.

When the buckets are assembled on the hub of the runner as just described, the hub 15 is lifted from the floor by means of a crane or other suitable hoisting apparatus (not shown).

The shroud ring 16 is then placed in an inverted position on a series of suitable supports 28 which are arranged beneath the elevated hub and buckets, and then the hub is lowered on to the floor. The supports 28 are preferably made of such height so that when the hub and buckets are repositioned on the floor, the outer edges of the buckets will be disposed within the shroud ring 16 in proper position to be secured thereto.

When the parts are thus positioned there will be a small gap or space between the edges of the buckets 17 and the inner or water surface of the shroud ring 16, as shown in Fig. 6, and due to the bevelled edge portions 25 of the buckets, V-shaped spaces will be formed on the opposite sides of the buckets adjacent to the inner face of the shroud ring 16.

In order to unite the parts of the runner together to form a homogeneous whole, any desired method can be used. Oxy-acetylene welding is one method that has been used, and in this process the metal is locally heated at the abutting surfaces to a state of fusion by means of a torch. The flame from the torch is directed towards the surfaces to be joined until the metal is molten. On account of the intense heat of the flame, the metal will be melted locally very rapidly. When the surfaces to be joined are in the proper state of fusion, the spaces or channels formed by the bevelled edges of the buckets are filled by fusing in additional metal which is obtained by melting with the torch the end of a stick of metal of the same general character as that used in making the parts of runner. The additional molten metal combines with the molten metal of the adjacent portions of the buckets and the shroud ring to thereby form a perfect union of the buckets and the shroud ring in which the parts are united into a homogeneous whole. When the buckets are being united to the shroud ring sufficient additional metal is used to form fillets 30 along the adjacent edges of the buckets, as shown in Figs. 7 and 8.

When all of the buckets 17 have thus been united to the shroud ring 16 the next operation consists in completing the welding of the buckets with the hub. This is done in substantially the same manner as that just described, in that the welding torch is directed towards the adjacent surfaces of the buckets and the hub until the metal is molten. The spaces or channels between the edges of the buckets and hub are then filled by fusing in additional metal which is obtained by melting with the torch the end of a stick of metal so as to form smooth fillets 31, as shown in Figs. 5 and 8. In instances where the hub 15 has the grooves 24 formed therein, sufficient additional metal is used to fill the grooves.

While we have herein described the oxy-acetylene method for welding the several parts of the runner together, we wish it to be understood that any other known method of welding can also be used if so desired, such for instance as the electric, fusion, atomic, or resistance methods of welding.

When the welding operation is completed, the hub 15, the buckets 17, and the shroud ring 16 will be rigidly united into a single homogeneous structure, with smooth joints therebetween, as shown in Figs. 1 and 8.

In Figs. 5 and 7, the parts which have been fused into a homogeneous structure are shown as being of a single piece, the heavier section lines denoting the additional metal used in forming the fillets and the dotted or broken lines indicating what were the outlines of the buckets and the adjacent surfaces of the band and the hub before the welding torch was applied thereto.

Since all of the parts of the runner are preformed to the desired shape and finish, when the parts are assembled and united together in the manner hereinbefore described, the result will be a mechanically balanced runner, and since the buckets are formed from sheet material, large spaces are formed therebetween. This results in the runner having greater capacity. Furthermore, the backs of the buckets are parallel to the shape of the front or driving faces, and for this reason, and because the thin buckets offer less resistance to the change in direction of the water at the entrance and also at the discharge of the runner, the runner will be more efficient and of greater capacity for the same discharge diameter, than are the runners of the same diameter which are formed by casting.

While a specific sequence of operations has been herein described for producing the runners in accordance with our invention, we wish it to be understood that the sequency of operations may be modified when so desired. For instance, when the parts are being assembled preparatory to welding, the hub, buckets, and shroud ring can be assembled, with the discharge portions of the buckets properly positioned relatively to the shroud ring prior to the application of the spots of welding to the buckets and hub.

Having described the invention, what we claim as new and desire to secure by Letters Patent is:—

1. In the manufacture of Francis runners for hydraulic turbines, the method which comprises first separately forming and finishing the hub, the shroud ring, and the buckets, the hub being formed with a series of grooves therein, one for each bucket, the side walls of the grooves being inclined, the buckets being formed from sheet metal, the edges of the buckets being bevelled, then assembling the buckets on the hub with the edges of the buckets arranged in spaced relation to the grooves in the hub, then tacking the buckets to the hub, then positioning the shroud ring and securing the buckets thereto by means of fused metal arranged in smooth fillets along the opposite faces of the buckets, and then securing the buckets to the hub by forming fillets of fused metal in the grooves in the hub and along the opposite sides of the buckets.

2. In the manufacture of runners of hydraulic turbines, the method which comprises first separately forming the hub, the shroud ring, and the buckets, the hub being constructed from cast steel and having a series of grooves therein, one for each bucket, the side walls of said grooves being inclined, the shroud ring being formed from a single piece of steel, and the buckets being formed from sheet steel, the edges of the buckets being chamfered, then assembling the buckets on the hub with the hub in an inverted position with the edges of the buckets arranged in spaced relation over the grooves in the hub, then attaching the buckets to the hub by spots of welding arranged at intervals along the adjacent portions of the hub and the buckets, then in positioning the shroud ring relatively to the buckets and finally securing the parts together by fusing metal at the joints therebetween.

3. In the manufacture of Francis runners for hydraulic turbines, the method which comprises first separately forming and finishing the hub, the shroud ring, and the buckets, the buckets being formed from sheet metal bent to the desired warp and curvature, the hub being formed from a single piece of cast metal, and the shroud ring being formed from a single piece of metal, then assembling the buckets on the hub with the edges of the buckets arranged in spaced relation to the hub, then tacking the buckets to the hub, then positioning the shroud ring and securing the buckets thereto by means of fused metal arranged in fillets along the opposite faces of the buckets, and then securing the buckets to the hub by forming fillets of fused metal in the spaces between the hub and the edges of the buckets and along the opposite sides of the buckets.

In testimony whereof we have hereunto signed our names this 24th day of November, 1931.

GEORGE A. JESSOP.
DANIEL C. DE VINE.